July 21, 1959
F. C. BURRELL
2,895,447
LIQUID LEVEL INDICATORS
Filed Feb. 10, 1958
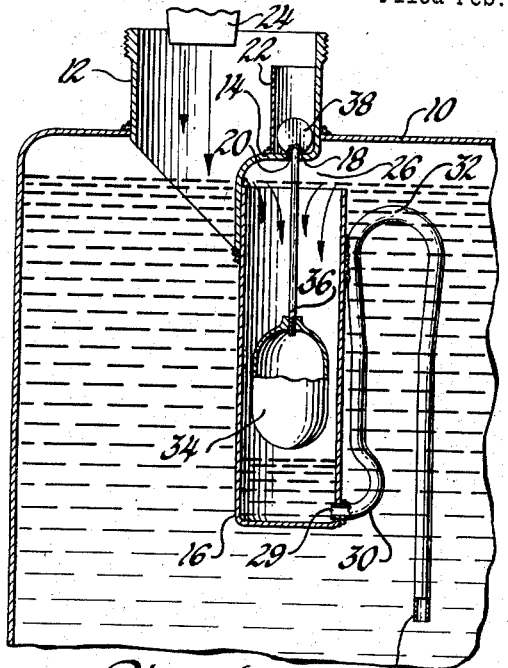
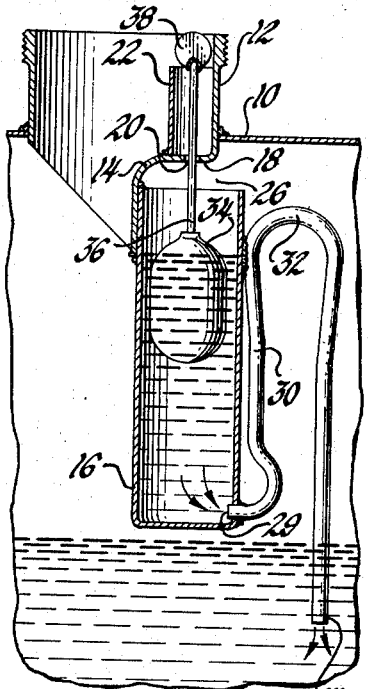
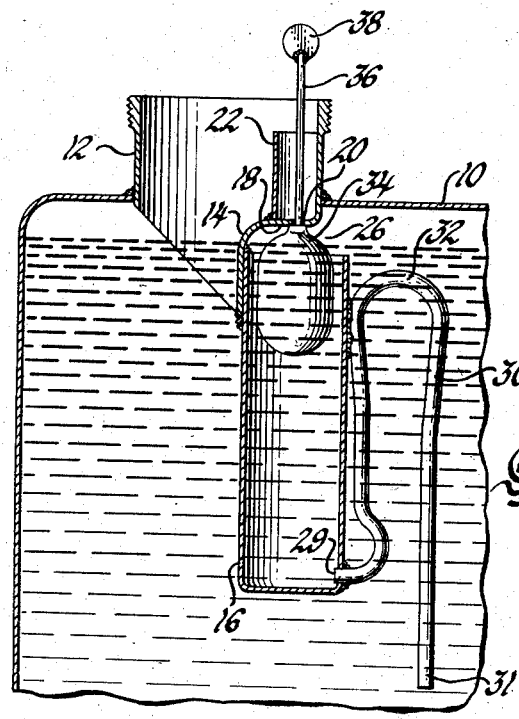
INVENTOR.
Frank C. Burrell
BY J. W. Lovett
ATTORNEY.

2,895,447
LIQUID LEVEL INDICATORS

Frank C. Burrell, Orchard Lake, Mich., assignor to General Motors Corporation, Detroit, Mich., a corporation of Delaware Application February 10, 1958, Serial No. 714,230

5 Claims. (Cl. 116—118)

This invention relates to liquid level indicators and more particularly to indicators associated with tanks in which predetermined liquid levels effect operation of the indicators.

In many fields of endeavor in which tanks for liquids are employed it is advantageous for users to be made quickly aware that a predetermined level of liquid in a given tank has been attained. It is essential in such a case that any indicator provided be simple, reliable in operation and effective in giving a pronounced and definite warning. To these ends, an object of the present invention is to provide, in association with a tank, an improved liquid level indicator which is simple in construction, low in cost and effective in operation.

A feature of the present invention is a float in a compartment having a port or opening at its upper end communicating with the interior of a tank at a predetermined level in the latter and a siphon tube connecting a lower zone of the compartment with a lower zone of the tank.

This and other important features of the invention will now be described in detail in the specification and then pointed out more particularly in the appended claims.

In the drawings:

Fig. 1 is a sectional view of a portion of a tank for liquid with an indicator in its non-functioning position as associated with the tank and embodying the present invention;

Fig. 2 is a view similar to that of Fig. 1 but showing the indicator in its signaling or operative position; and Fig. 3 shows a portion of the tank with the indicator in an intermediate position subsequent to imparting a signal.

The drawings depict a gasoline or fuel tank 10 having a filler spout 12 attached thereto. A portion of the spout is in the form of a depending flange 14 to which is attached a means or vessel 16 which is closed at its bottom. The flange 14 is provided with a horizontal midportion 18 having a vertically directed opening 20. Within the filler spout 10 and surrounding the zone immediately above the opening 20 is a semi-cylindrical wall 22 which is open at its top. A nozzle 24, the end of which is depicted in Fig. 1, constitutes a means whereby the tank 10 may be filled with liquid or fuel. The top of the vessel 16 cooperates with the horizontal portion 18 of the flange 14 in defining a port 26 giving communication between the compartment within the vessel 16 and an upper zone of the interior of the tank 10.

A low zone within the vessel 16 communicates with one end 29 of a siphon tube 30. The other end 31 of this tube extends to a zone within the tank 10 which is below the bottom of the vessel 16. It is important that the top curved end 32 of the siphon tube be located a slight distance below the port 26 or top edge of the vessel 16, as will further appear when the operation of the indicator is described.

A float 34 is arranged to be freely movable in a vertical direction within the vessel 16 and this float is connected by means of a rod 36 to an indicator disc 38 which is free to move vertically within the semi-cylindrical wall 22. This disc 38 may be brightly colored or may be an electrical contact for breaking or making a circuit or it may take some other form of structure to be actuated by a rise and fall of the float 34 as will readily be understood. The rod 36, of course, is freely movable or slidable within the opening 20.

In the operation of the device and assuming that the tank 10 is substantially empty of liquid, the float 34 will, of course, rest in its lowest position which is as seen in Fig. 1. When liquid or fuel is introduced to the tank by way of the nozzle 24, the liquid will rise around the depending ends of the siphon tube 30 and the vessel 16 but with no initial raising effect on the float 34. When the liquid level reaches or flows over the curved top or curved portion 32 of the tube 30, however, the air in that tube will be forced or evacuated from the tube and discharged into the vessel 16 by the rising liquid and, with continued supplying of fuel from the nozzle 24, the tube 30 and the vessel 16 will both fill with liquid as the latter flows primarily through the port 26 with a consequent rapid rise of the float 34. The disc 38 will come into view at a rate giving a visual indication that a "full" condition is being approached and, when the fuel completely fills the vessel 16, the disc 38 will be at its highest or "full" position as shown in Fig. 2.

With removal of the supply nozzle 24 and subsequent use or depletion of the fuel supply in the tank 10 to a level below the bottom of the vessel 16 or, more accurately, below the end 29 of the tube 30, the liquid in the vessel will flow, as indicated by the arrows in Fig. 3, back into the main chamber of the tank 10 by way of the siphon tube. The float 34 will lower into a position at which the indicator disc 38 will be concealed from view.

It is interesting to note that the disc 38 will not be in the view of the operator until the predetermined level which is to be indicated is being approached and has been attained. That level will be above the curved portion 32 of the siphon tube. As the distance between the portion 32 and the upper lip of the vessel 16 is not great, the change in liquid level in the tank 10 is within a very small range when effective in moving or raising the float 34. As a result, the indicator disc gives a relatively sudden warning that the predetermined level in the tank is being reached. The quick action increases the effectiveness of the warning. When the fuel supply in the tank 10 is subsequently consumed to an extent that its upper level falls below the end 29 of the tube 30, the siphon action takes place quickly to empty the vessel 16 with a consequent prompt lowering of the indicator disc 38. It is obvious that the vessel 16 could be outside the tank 10 and communicating with the latter by way of an upper port equivalent to the port 26 with a siphon tube passing through the wall of the tank. The curved end 32 of the siphon tube is below the upper edge of the vessel 16 and this prevents a fluid flow through the tube which would fill the vessel before the predetermined tank level is immediately approached.

I claim:

1. A liquid level indicator associated with a tank, said indicator comprising means defining a compartment with a port at the upper end of said compartment communicating at a predetermined level with the interior of said tank, a float in said compartment, an indicator arranged to be moved by said float, a siphon tube connecting the bottom of said compartment with a lower zone of said tank, and said tube being entirely located below said port.

2. A liquid level indicator associated with a tank, said indicator comprising means defining a compartment with a port at the upper end of said compartment and connected directly with an upper zone of said tank, a float in said compartment freely movable in a vertical direction, an indicator arranged to be moved by said float, a siphon tube connecting the bottom of said compartment with a zone of said tank below the bottom of said compartment, and said tube being entirely located below said port.

3. A liquid level indicator associated with a tank, said indicator comprising a vessel mounted in said tank and defining a compartment with a port at its upper end communicating with the interior of said tank, a vertically movable float in said compartment, an indicator arranged to be moved by said float, a siphon tube having one end connected to a bottom zone of said compartment and the other end connected with a zone of said tank below said one end, and all portions of said siphon tube being located below said port.

4. A liquid level indicator associated with a tank, said indicator comprising a vessel supported within an upper zone of said tank, a port leading from said vessel to said zone, a float in said vessel, an indicator arranged to be moved by said float and extending through a wall of said tank, a siphon tube having one end connected to a bottom zone of said vessel and its other end connected to a lower zone of said tank, and said siphon tube having its intermediate portion located below said port.

5. A liquid level indicator associated with a tank, said indicator comprising a tubular vessel vertically arranged within an upper zone of said tank and closed at its lower end, the upper end of said vessel communicating with an upper zone of said tank, a vertically movable float in said vessel, a rod supported by said float and extending upwardly through the wall of said tank and freely movable with respect thereto, an indicator movable with said rod, a siphon tube having one end connected to a lower zone of said vessel and another end communicating at a lower level with the interior of said tank, and all portions of said siphon tube being located below the upper end of said vessel.

References Cited in the file of this patent

UNITED STATES PATENTS

| | | |
|---|---|---|
| 1,293,027 | Burton | Feb. 4, 1919 |
| 2,735,298 | Dispenza | Feb. 21, 1956 |

FOREIGN PATENTS

| | | |
|---|---|---|
| 474,077 | Great Britain | Oct. 25, 1937 |